United States Patent
Boothe et al.

(10) Patent No.: US 8,303,871 B2
(45) Date of Patent: Nov. 6, 2012

(54) APPARATUS AND METHOD FOR CONTROLLED PELLETIZATION PROCESSING

(75) Inventors: Duane A. Boothe, Clifton Forge, VA (US); Wayne J. Martin, Buchanan, VA (US); Roger B. Wright, Staunton, VA (US)

(73) Assignee: Gala Industries, Inc, Eagle Rock, VA (US)

( * ) Notice: Subject to any disclaimer, the term of this patent is extended or adjusted under 35 U.S.C. 154(b) by 312 days.

(21) Appl. No.: 12/226,615

(22) PCT Filed: Nov. 24, 2006

(86) PCT No.: PCT/US2006/045375
§ 371 (c)(1),
(2), (4) Date: May 28, 2009

(87) PCT Pub. No.: WO2007/064580
PCT Pub. Date: Jun. 7, 2007

(65) Prior Publication Data
US 2009/0273112 A1    Nov. 5, 2009

Related U.S. Application Data

(60) Provisional application No. 60/739,943, filed on Nov. 28, 2005.

(51) Int. Cl.
*B29B 9/06* (2006.01)
(52) U.S. Cl. .................................. 264/142; 425/205
(58) Field of Classification Search .................. 264/142; 425/205
See application file for complete search history.

(56) References Cited

U.S. PATENT DOCUMENTS

| | | | |
|---|---|---|---|
| 3,458,045 A | | 7/1969 | Dudley |
| 3,822,108 A | * | 7/1974 | Mihalik ........................ 425/143 |
| 3,860,220 A | | 1/1975 | Matsubayashi et al. |
| 4,104,481 A | * | 8/1978 | Wilkenloh et al. .............. 174/28 |
| 4,123,207 A | | 10/1978 | Dudley |
| 4,251,198 A | | 2/1981 | Altenburg |
| 4,331,623 A | * | 5/1982 | Zurkoff et al. ................ 264/141 |
| 4,447,325 A | | 5/1984 | Pauley |
| 4,448,737 A | * | 5/1984 | Johnson .......................... 264/53 |
| 4,500,271 A | | 2/1985 | Smith |
| 4,565,015 A | | 1/1986 | Hundley, III |
| 4,617,227 A | | 10/1986 | Weaver |
| 4,728,276 A | | 3/1988 | Pauley et al. |
| 4,746,478 A | * | 5/1988 | Fujisaki et al. ................. 264/53 |
| 4,822,546 A | * | 4/1989 | Lohkamp ...................... 264/143 |
| 4,892,691 A | * | 1/1990 | Kolossow ....................... 264/54 |
| 5,019,610 A | | 5/1991 | Sitz et al. |
| 5,041,251 A | * | 8/1991 | McCoskey et al. ........... 264/130 |
| 5,059,103 A | | 10/1991 | Bruckmann et al. |
| 5,265,347 A | | 11/1993 | Woodson et al. |
| 5,298,263 A | | 3/1994 | Yatka et al. |
| 5,458,474 A | | 10/1995 | Neubauer et al. |
| 5,482,722 A | | 1/1996 | Cook |

(Continued)

*Primary Examiner* — Joseph Del Sole
*Assistant Examiner* — David N Brown, II
(74) *Attorney, Agent, or Firm* — Jacobson Holman PLLC

(57) ABSTRACT

An apparatus and process maintain control of the temperature of low-melting compounds, high melt flow polymers, and thermally sensitive materials for the pelletization of such materials. The addition of a cooling extruder, and a second melt cooler if desired, in advance of the die plate provides for regulation of the thermal, shear, and rheological characteristics of narrow melting-range materials and polymeric mixtures, formulations, dispersions or solutions. The apparatus and process can then be highly regulated to produce consistent, uniform pellets of low moisture content for these otherwise difficult materials to pelletize.

33 Claims, 6 Drawing Sheets

U.S. PATENT DOCUMENTS

| | | |
|---|---|---|
| 5,638,606 A | 6/1997 | Bryan et al. |
| RE36,177 E | 4/1999 | Rouyer et al. |
| 5,936,015 A | 8/1999 | Burns |
| 5,987,852 A | 11/1999 | Bozich et al. |
| 6,057,390 A | 5/2000 | Loza et al. |
| 6,120,899 A | 9/2000 | Cameron et al. |
| 6,150,439 A | 11/2000 | Keiichi et al. |
| 6,237,244 B1 | 5/2001 | Bryan et al. |
| 6,358,621 B1 | 3/2002 | Hughes et al. |
| 6,485,664 B1 | 11/2002 | Wreschinsky |
| 6,500,371 B1 | 12/2002 | Berbner et al. |
| 6,713,540 B2 | 3/2004 | Rached et al. |
| 6,739,457 B2 | 5/2004 | Humphries, II et al. |
| 6,759,454 B2 | 7/2004 | Stephens et al. |
| 6,793,473 B1 | 9/2004 | Fridley |
| 6,807,748 B2 | 10/2004 | Bryan et al. |
| 6,811,797 B1 | 11/2004 | Wolfe et al. |
| 6,818,236 B2 | 11/2004 | Hill et al. |
| 6,852,345 B2 | 2/2005 | Hill et al. |
| 6,858,237 B1 | 2/2005 | Wolfe et al. |
| 6,872,784 B2 | 3/2005 | Zhou |
| 6,890,982 B2 | 5/2005 | Borsinger et al. |
| 6,906,148 B2 | 6/2005 | Krebs et al. |
| 6,914,102 B2 | 7/2005 | Kleineberg et al. |
| 6,926,916 B1 | 8/2005 | Day et al. |
| 6,930,148 B2 | 8/2005 | Gipson |
| 6,946,528 B2 | 9/2005 | Domine et al. |
| 2004/0249008 A1 | 12/2004 | Lee et al. |
| 2005/0101702 A1 | 5/2005 | Stuart, Jr. et al. |
| 2005/0191325 A1 | 9/2005 | Remon |

* cited by examiner

APPARATUS AND METHOD FOR CONTROLLED PELLETIZATION PROCESSING

This is a national stage of PCT/US2006/045375 filed Nov. 24, 2006 and published in English, claiming benefit of U.S. provisional application No. 60/739,943, filed Nov. 28, 2005.

FIELD OF THE INVENTION

The present invention generally relates to an apparatus and process which can provide careful regulation of the thermal, shear, and rheological components of materials in a pelletization process. The materials being pelletized are prepared or formulated in a mixing device such as a vessel or extruder and subsequently processed through a heat exchanger and extruder to achieve the proper temperature for that pelletization without detrimental phase separation or die freeze off and which provides uniform pellet geometries and acceptably low pellet moisture levels. The apparatus and method of this invention has application for narrow-range melting compounds, high melt flow formulations, low melting temperature materials, and polymeric mixtures, formulations, dispersions, or solutions of which waxes, asphalts, adhesives including hot melt adhesives, high melt flow polyolefins including polypropylenes and copolymers, and gum base formulations are exemplary.

DESCRIPTION OF RELATED PRIOR ART

Pelletization of materials and particularly polymeric materials has been well-known in the art for many years and has been integral to the operations of the assignee of the present invention from as early as U.S. Pat. No. 4,123,207 issued Oct. 31, 1978. Processing polymeric materials through heat exchangers and extruders have similar early histories in the literature and have been used in association with pelletizers in various arrangements throughout that period. Processing pellets through centrifugal dryers to obtain suitably low moisture pellets is readily established in the literature and has been instrumental to the present assignee from as early as U.S. Pat. No. 3,458,045 issued Jul. 29, 1969. Modifications and improvements of these processes have been demonstrated through subsequent issuance of U.S. Pat. Nos. 4,251,198 (Feb. 17, 1981), 4,447,325 (May 8, 1984), 4,500,271 (Feb. 19, 1985), 4,565,015 (Jan. 21, 1986), 4,728,276 (Mar. 1, 1988), 5,059,103 (Oct. 22, 1991), 5,265,347 (Nov. 30, 1993), 5,638,606 (Jun. 17, 1997), 6,237,244 (May 29, 2001), 6,739,457 (May 25, 2004), 6,793,473 (Sep. 21, 2004), and 6,807,748 (Oct. 26, 2004) owned by the assignee of the present invention and included herein by way of reference exemplarily in whole or in part.

The following additional patents and published patent applications are relevant to the present invention:

| U.S. patents |
| --- |
| RE36,177 |
| 4,617,227 |
| 5,019,610 |
| 5,298,263 |
| 5,482,722 |
| 5,936,015 |
| 5,987,852 |
| 6,057,390 |
| 6,120,899 |

-continued

| U.S. patents |
| --- |
| 6,150,439 |
| 6,358,621 |
| 6,713,540 |
| 6,759,454 |
| 6,811,797 |
| 6,818,236 |
| 6,852,345 |
| 6,872,784 |
| 6,858,237 |
| 6,890,982 |
| 6,906,148 |
| 6,914,102 |
| 6,926,916 |
| 6,930,148 |
| 6,946,528 |

U.S. Published Patent Applications

2005/101702 2005/191325

Pelletization of polymeric materials has proven particularly successful for a wide range of material types where rapid cooling quickly solidifies at least the outermost layer or layers of the pellet formed allowing them to be propagated to a dryer or to further processing. There are numerous materials which suffer from qualities which do not lend themselves readily to these processes. Exemplary of these qualities are very narrow melting ranges, low temperature melting ranges, low viscosity of molten or semi-solid materials, slow thermal conductivity and therefore slow ability to cool rapidly enough for processing, proclivity to undergo phase separation on cooling, surface tack, poor miscibility of liquids during blending processes, and extreme temperature variance from the mixing/blending stage to the extrusion/pelletization stage. Materials which typically exhibit the foregoing properties and, therefore, have heretofore not lent themselves to pelletization technologies include, for example, waxes, asphalts, adhesives, gum base formulations, high melt-flow polyolefins, and non-polymeric organic and/or inorganic compounds. Hence, there is a need in the art for an apparatus and process which can successfully pelletize these challenging materials and applications, especially when using underwater pelletizers to form the pellets.

SUMMARY OF THE INVENTION

The material, or materials, to be pelletized in accordance with the present invention are charged into a vessel or an extruder to be melted, sheared, and/or mixed. The vessel may be at atmospheric pressure, pressurized, or under vacuum and may be unpurged or purged with air or an inert gas such as nitrogen, argon, or the like. Pressure, vacuum, and purging may be applied sequentially or continuously in any combination and order. The requisite energy converts the formulation to a molten or semi-solid mixture or liquid which flows suitably by gravity or under pressure when released in batch processing or continuous flow processing. The applied energy may be thermal and/or mechanical in the form of low, medium, or high shear as necessitated by the formulation requirements which directly and significantly impacts the temperature of the molten, semi-solid or liquid material.

The material mixed or blended in the vessel, once released, optionally may flow into and through a booster pump and/or is pressurized sufficiently to flow through a coarse filter apparatus as required. The material from the vessel, pressurized and/or filtered as required, or alternately from an extruder, then flows through a diverter valve which allows the material to flow toward a heat exchanger or melt cooler or otherwise recirculate back to the vessel or extruder, or may be purged or discharged from the system. Pressure is induced on the melt flow by a melt pump with discharge into the melt cooler for significant temperature reduction. Additional mixing may be achieved wherein baffles are within the melt cooler. Cooling by the heat exchanger may be sufficient to allow some crystallization or phase separation within the melt. Alternatively, the diverter valve may be placed after the melt cooler rather than as described above with similar capabilities as described therein.

In accordance with the present invention, the material to be pelletized, after exiting from the melt cooler or heat exchanger, is fed to a cooling extruder. The cooling extruder provides for more efficient mixing while at the same time providing additional and controlled cooling of the molten, semi-solid mixture or liquid material. The combination of the melt cooler and the cooling extruder surprisingly allows for pre-cooling of the molten material which reduces the total energy, including the thermal energy, contained within that material more effectively than can be achieved by an extruder operating alone.

The cooling extruder optionally allows purging, devolatilization, or addition of other chemicals or materials inclusive of which may be impurities, by-products, degradation products, volatiles or thermally sensitive components as required by or as a consequence of the formulation and processing. Control of the cooling temperature and thorough mixing during the melt cooler and cooling extruder sequence are necessary to insure uniform homogeneity of the material or mixture being processed and to reduce the temperature to, or near to, that at which pelletization occurs. This lowering of the temperature serves to reduce or eliminate the likelihood that phase separation or die freeze-off will result during extrusion/pelletization.

The molten, semi-solid mixture or liquid material or materials leaving the cooling extruder continues through the processing or may be discharged out of the system through the diverter valve. Continuation of the flow proceeds toward the pelletization unit and passes through a melt pump to pressurize the flow sufficient to pass optionally through a secondary melt cooler or directly into the pelletization unit. Additionally, a melt pump may be necessary following the secondary melt cooler to insure adequate pressurization for the extrusional pelletization.

The pressurized melt proceeds through the thermally regulated die toward the water box of the underwater pelletizer or other equivalent pelletization unit known to those skilled in the art. The uniformly dispersed fluid material passes through the die and is cut by rotating blades in the pelletizing unit. Water which is thermally controlled removes the pellets from the cutter blade and transports them through the agglomerate catcher for removal of coarsely aggregated or agglomerated pellets, through the dewatering device, and into the centrifugal dryer or fluidized bed to remove excipient surface moisture from the pellets.

The pellets may pass through the pellet discharge chute either for collection or may proceed to additional processing including pellet coating, crystallization, or further cooling as required to achieve the desired product. As is readily understood by those skilled in the art, coating, enhanced crystallization, cooling operations, or other processing appropriate to the pelletized material may be performed after pelletization and before introduction of the pellet into the drying process as well.

While the additional extruder added to the pre-pelletizing processing of the polymer or other material to be pelletized in accordance with the present invention has been called a "cooling extruder", those skilled in the art will readily understand that any known or available extruder can be used as the cooling extruder. The cooling extruder, therefore, may be a single, twin, or multiple screw design, or a ring extruder for example. The cooling extruder is preferably a single screw and more preferably a twin screw.

DETAILED DESCRIPTION OF THE INVENTION

Figure 1:
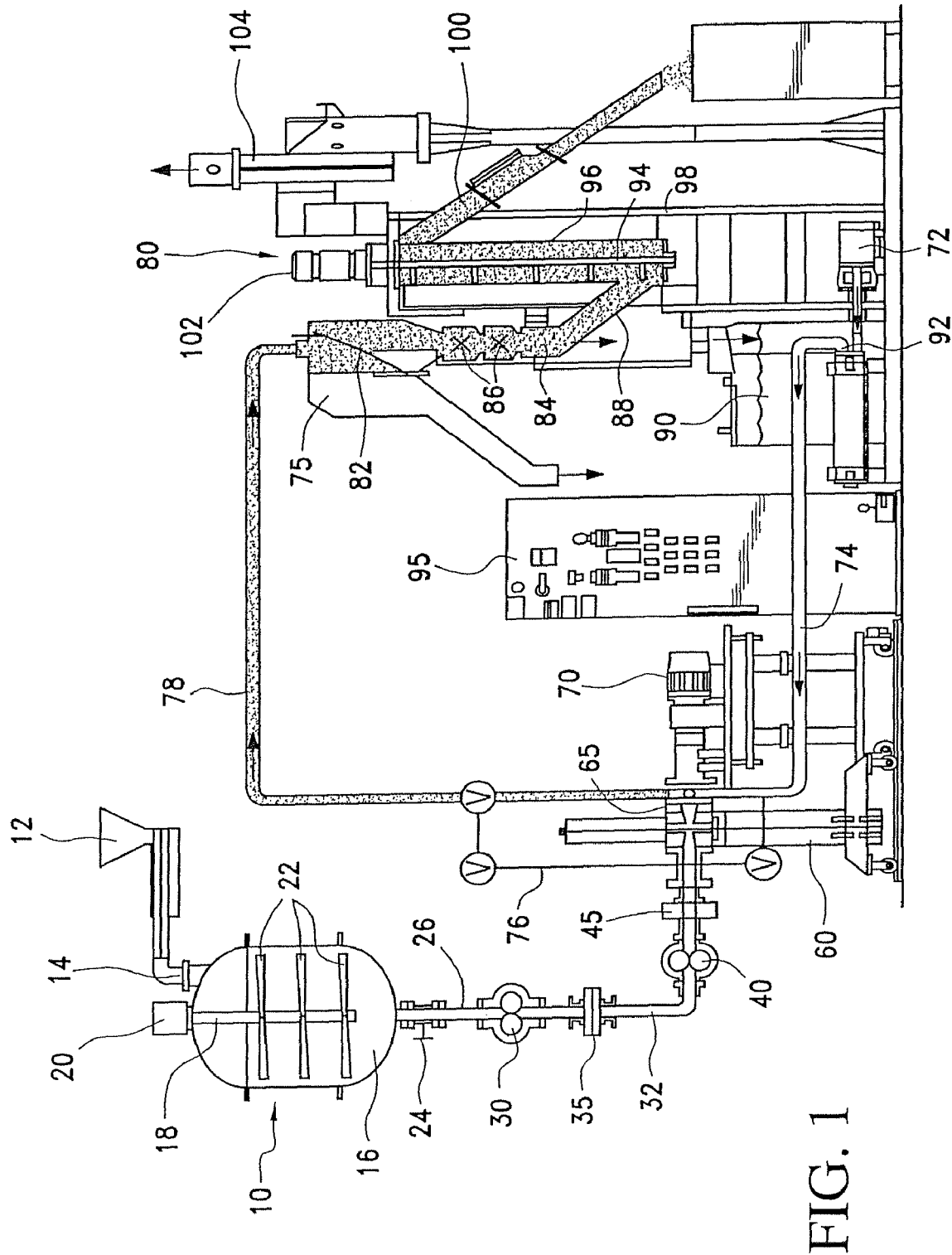
FIG. 1 is a schematic drawing illustrating a first conventional mixing vessel, pelletizer, and centrifugal dryer.

Although preferred embodiments of the invention are explained in detail, it is to be understood that other embodiments are possible. Accordingly, it is not intended that the invention is to be limited in its scope to the details of constructions, and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose. Where possible, components of the drawings that are alike are identified by the same reference numbers.

Referring specifically to the drawings, FIG. 1 illustrates a basic prior art system including a mixing vessel, pelletizer, and centrifugal dryer. Material or component materials to be pelletized are fed into the thermally regulated mixer or blender, generally designated by reference numeral 10, manually as a solid or liquid, or by a feed screw 12, pump, or similar device through or attached to the vessel orifice 14. The vessel chamber 16 may be atmospheric or purged with air or an inert gas, preferably nitrogen or argon. Liquids may be drawn into the chamber 16 by siphoning with a partial vacuum. This may be useful for reactive or moisture-sensitive components. Components may be added in portions with mixing and warming to temperature as required. Mixing is achieved by rotation of the rotor 18 by motor 20. Attached to the rotor are mixing blades 22 exemplary of which may be propeller or boat style, ploughshare style, delta or sigma style in single, double or multiple configurations, and helical or helical dispersion blades. Alternatively the mixer may be a ribbon blender, Banbury-type blender, horizontal mixer, vertical mixer, planetary mixer or equivalent device known to those skilled in the art.

Various levels of mixing and shear are achieved by the differing styles of blades and mixer designs. Higher shear blades are preferred for components such as rubbers or cross linkable rubbers and thermally sensitive polymers. Energy is introduced into the polymer and resultant mixture mechanically by the shear, as well as thermally by any conventional physical heating process. Propeller style blades are more preferred for physical mixing where less or no shear is required to achieve uniformity of blending. Heating of the vessel (and its contents) may be achieved electrically, by steam, or by circulation of hot liquids such as oil or water. Mixing or blending continues until the batch reaches an appropriate temperature or other criterion of consistency determined or known specifically for the process.

On reaching the appropriate pour point, valve 24 is opened and the molten, semi-solid mixture or liquid material or materials (hereinafter sometimes collectively "the melt") passes into the pipe 26 and is drawn into the booster pump 30. The booster pump 30 may be a centrifugal or positive displacement reciprocating or rotary pump, and preferably is a rotary pump which may be a peristaltic, vane, screw, lobe, progressive cavity, or gear pump, and more preferably is a gear pump. The gear pump may be high precision, or even more preferably open clearance, and generates an intermediate pressure, typically up to 500 psi and preferably less than 150 psi. The pump pressure is sufficient to force the melt through the coarse filter 35 which is preferably a candle filter, basket filter, or screen changer, and is more preferably a basket filter of 20 mesh or coarser. The coarse filter 35 removes larger particles, agglomerates, or granular material from the melt as it flows through the pipe 32 to and through melt pump 40 which generates pressures on the melt, preferably at least 200 psi and more preferably from 500 psi to 2000 psi. The melt pump 40 may be a centrifugal or positive displacement reciprocating or rotary pump, and preferably is a rotary pump which may be a peristaltic, vane, screw, lobe, progressive cavity, or gear pump, and more preferably is a gear pump. Seals must be compatible with the material being processed, chemically and mechanically, the details of which are well understood by those skilled in the art.

The pressurized melt passes through a second filter 45 which is preferably a basket filter or screen changer, and is more preferably a screen changer of 200 mesh or coarser, and even more preferably a multilayer screen changer of two or more screens of differing mesh, most preferably a series of filters exemplary of which is 20 mesh, 40 mesh, and 80 mesh. The screen changer may be manual, plate, slide plate, single or dual bolt, and may be continuous or discontinuous. The melt passes into and through the diverter valve 60 wherein the melt may be diverted to waste, to a recycle stream back to the vessel 16, or may continue to the extrusion die 65. Pressure generated by the melt pump 40 must be sufficient to force the melt through the screen changer 45, the diverter valve 60 and through the die plate 65 without allowing the melt to cool and potentially freeze off the die openings in the die plate 65. The extrusion die contains a multiplicity of orifices of number and geometry appropriate to the flow rate, throughput, and melt material as is known to those skilled in the art.

Pelletization of the melt is achieved by an underwater, hot face, strand, water ring or similar pelletizer, and preferably by an underwater pelletizer 70 of construction by or similar to designs marketed by Gala Industries, Inc., (Eagle Rock, Va.), the assignee of the present invention (hereinafter "Gala"). As the melt extrudes through the die plate orifices, the pelletizer motor rotates a series of blades which cut the strands of melt into small pellets. The pellets so made are conveyed out of the water box by a rapid flow of thermally controlled water provided by the pump 72 through the conduit 74 and out through the effluent pipe 78. Alternatively, a series of valves and piping form a bypass loop 76 that allows the water to be shunted past the water box when the molten material is not being pelletized. The temperature of the water, the rotational rate of the cutter blades, and the flow rate of the melt through the die contribute to the production of proper pellet geometries. The temperature of the pellets, both in the interior and the exterior or shell, also influence the formation of the pellets as well as the drying of the pellets. The flow rate of the water through the pipe 78 should be sufficiently rapid to convey the pellets to the dryer, generally designated by reference numeral 80, with controlled loss of heat from the pellets. The dryer 80 is preferably a centrifugal pellet dryer as manufactured by Gala.

Drying of the pellets with controlled loss of heat is achieved by passing the pellet and water slurry through an agglomerate catcher 75 which contains a round wire grid or coarse screen 82 to remove oversize chunks or agglomerates of pellets. The slurry optionally passes through a dewatering device 84, or series of dewatering devices, containing baffles 86 and an angular feed screen 88 which collectively reduce the water content, preferably 90 percent, and more preferably 98 percent or more. The water removed passes through the fines removal screen 92 into a water tank or reservoir 90 and is available for recycling or disposal. The pellets immediately transfer to the inlet at the base of the centrifugal dryer 80 where they are lifted rotationally upward by a rotating rotor with lifters 94 and are propelled outwardly against a foraminous screen 96, preferably a perforated plate or pierced screen, concentrically surrounding the rotor/lifter assembly 94 and contained within the housing 98. As the pellets impact the screen, the excess surface moisture is transferred away through the screen, and the pellets bounce back multiple times while being lifted farther up the dryer toward the dried pellet chute 100 at the top of the dryer 80. Motor 102 rotates the rotor/lifter assembly 94 and counter-current air flow is provided by blower 104 in models of centrifugal dryers marketed by Gala as previously noted. Power for all processes is provided by control system 95. The dried pellets pass out the chute 100 for storage or may be further processed with coatings, additional crystallization, or further cooled as is well understood by those skilled in the art. The design and operation of the pelletizer and centrifugal dryer are detailed in the aforementioned patents by Gala.

Figure 2:
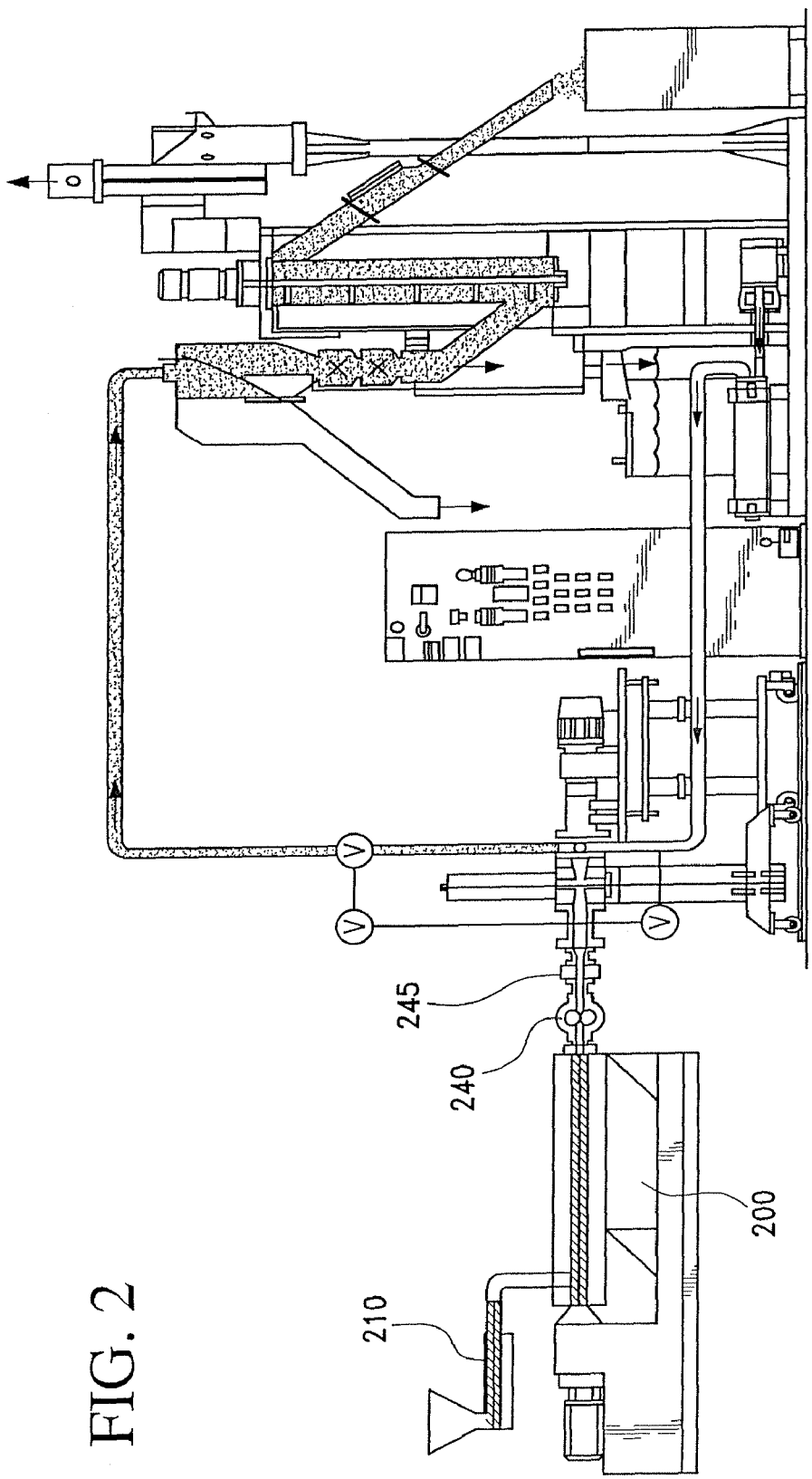
FIG. 2 is a schematic drawing illustrating a second conventional extruder, pelletizer and centrifugal dryer.

Turning now to FIG. 2, an alternative prior art embodiment is illustrated. Instead of mixing vessel 10 and related components of FIG. 1, an extruder 200 with one or more feed units 212 is utilized to mix and heat the melt material to be pelletized. The extruder 200 optionally may be a single, twin, or multiple screw design, a ring extruder for example, and is preferably a single screw and more preferably a twin screw. The sections of the screw must feed, mix, and convey the melt material simultaneously providing sufficient energy, thermal and mechanical, to melt, mix, and uniformly disperse the melt material or materials to be pelletized. The twin screw or multiple screw is capable of being purged by air or preferably an inert gas, such as nitrogen, or may be evacuated at one or more ports to remove gases, volatiles, or impurities. Multiple feeding and injection ports may be added along the barrel of the screw as required to allow addition of ingredients, solid or liquid, to the melt in process. Configuration of the screw must be satisfactory to achieve an appropriate level of feeding, mixing, melting, blending, and throughput and is well understood by those skilled in the art.

Once the melt materials are properly admixed in the extruder 200 the melt optionally may pass through a melt pump 240 and/or a screen changer 245 comparable to melt pump 40 and screen changer 45, respectively, as described for FIG. 1. Pressure generated by the extruder 200 or by the extruder 200 and melt pump 240 must be sufficient to extrude the melt through the die and pelletization system which follow the equipment described for FIG. 1. Designs illustrated in FIG. 1 and FIG. 2 require the components upstream of the extrusion die 65 in FIG. 1 and analogously in FIG. 2 to provide sufficient energy to mix, melt, and extrude the melt. Where shear is high, as is common in gum base and adhesive formulations, these same elements must not only input tremendous energy to achieve that shear but then must cool or otherwise dissipate that energy and heat prior to the extrusion through the die to avoid excessively low viscosity or excessively hot pellets which lead to extruded material wrapping around the die face by the cutter, elongated pellets, and formation of poor geometry pellets and/or pellet aggregates and agglomerates. The zones of the extruder distal from the material inlet, therefore more proximal to the extruder outlet can be adjusted to provide some of this cooling by reducing the actual temperature of the zones or sections. Designs in the configuration of FIG. 1 do not have this capability.

Figure 3:
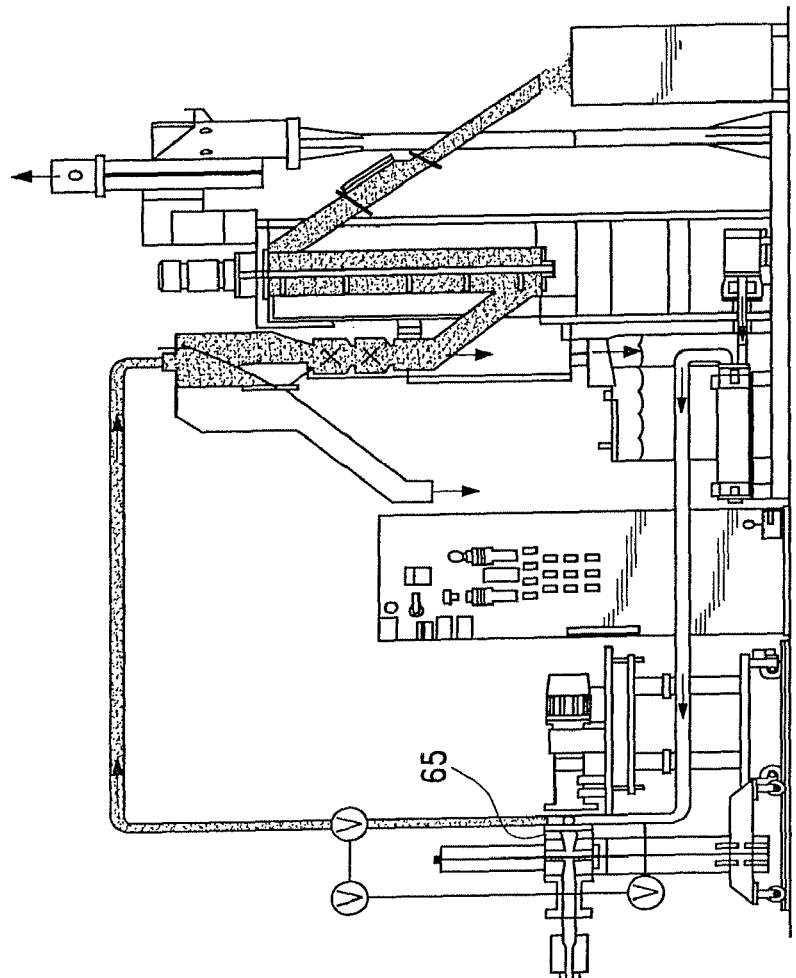
FIG. 3 is a schematic drawing illustrating a sequentially arranged mixing vessel, melt cooler, pelletizer and centrifugal dryer known in the prior art.
Figure 3:
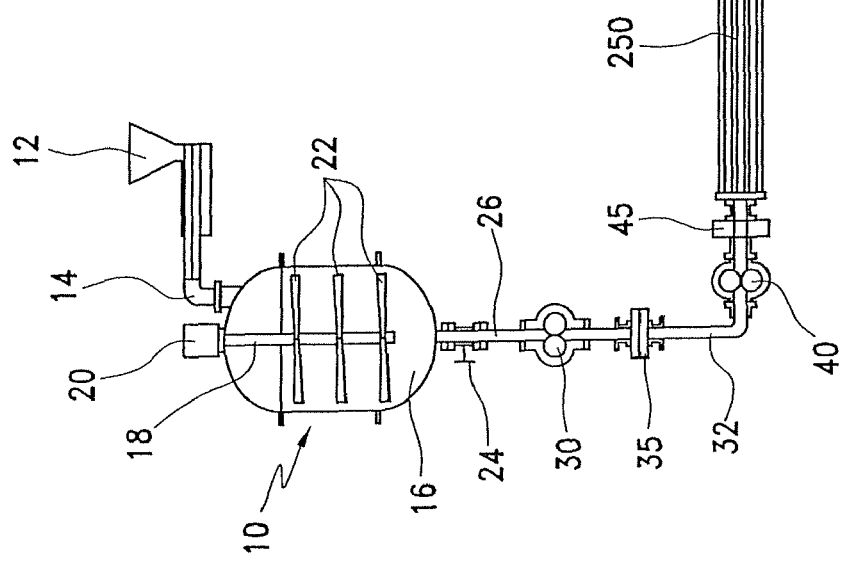

A present commercial design which interjects cooling into the apparatus illustrated in FIG. 1 is shown in FIG. 3. The components described in FIG. 1 are identified with numerically the same number and fulfill all conditions and preferences of the FIG. 1 illustration. A melt cooler 250 is introduced into the process following the melt pump 40 and screen changer 45. The melt pump 40 must generate sufficient pressure to force the melt through the melt cooler 250 and on through the extrusion die 65 and for the subsequent processing described for FIG. 1. The melt cooler 250 is a heat exchanger of the coil type, scrape wall, plate and frame, shell and tube design with or without static mixers, or U-style tube design with or without static mixers, and preferably is a shell and tube design which includes static mixing blades within the individual tubes to further mix the material and bring more of the material in intimate contact with the wall of the tube outside of which is a flow of oil or water coolant circulating within the shell housing, preferably in a countercurrent flow pattern as is understood by those skilled in the art. The temperature and flow rate of the circulating medium is carefully regulated by a control unit, not shown. This unit is capable of reducing the temperature of the melt prepared in vessel 10 to that which will allow extrusion of the melt through the die plate 65 with reduced likelihood of wrap around the die face by the cutter, improved pellet geometry, lower pellet temperature, and less aggregation and agglomeration of the pellets.

Limitations of the FIG. 2 and the FIG. 3 embodiments remain problematic in that cooling, though present, does not have a level of control and narrowness of definition of degree in temperature to acceptably be able to reproducibly produce high quality pellets of narrow melting range materials, such as waxes, where the liquid to solid temperature transition may be twenty degrees or less, and may be as narrow as only a few degrees. The designs illustrated in FIGS. 1-3 are further limited in their capacity to achieve sufficient dispersive mixing to eliminate phase separation of blended materials, examples of which include synthetic asphalt formulations, adhesive and hot melt adhesives, and gum bases.

Furthermore, materials of high melt flow index commonly require high shear to melt the material after which the resultant viscosity is extremely low and with limited cooling as exemplified in FIGS. 2 and 3 may still result in problematic extrusion as cited in the foregoing discussions. For these materials the temperature transition from fluid to more viscous semi-solid or solid is typically narrow and control challenges are similar in difficulty to those encountered for waxes and the like.

Figure 4:
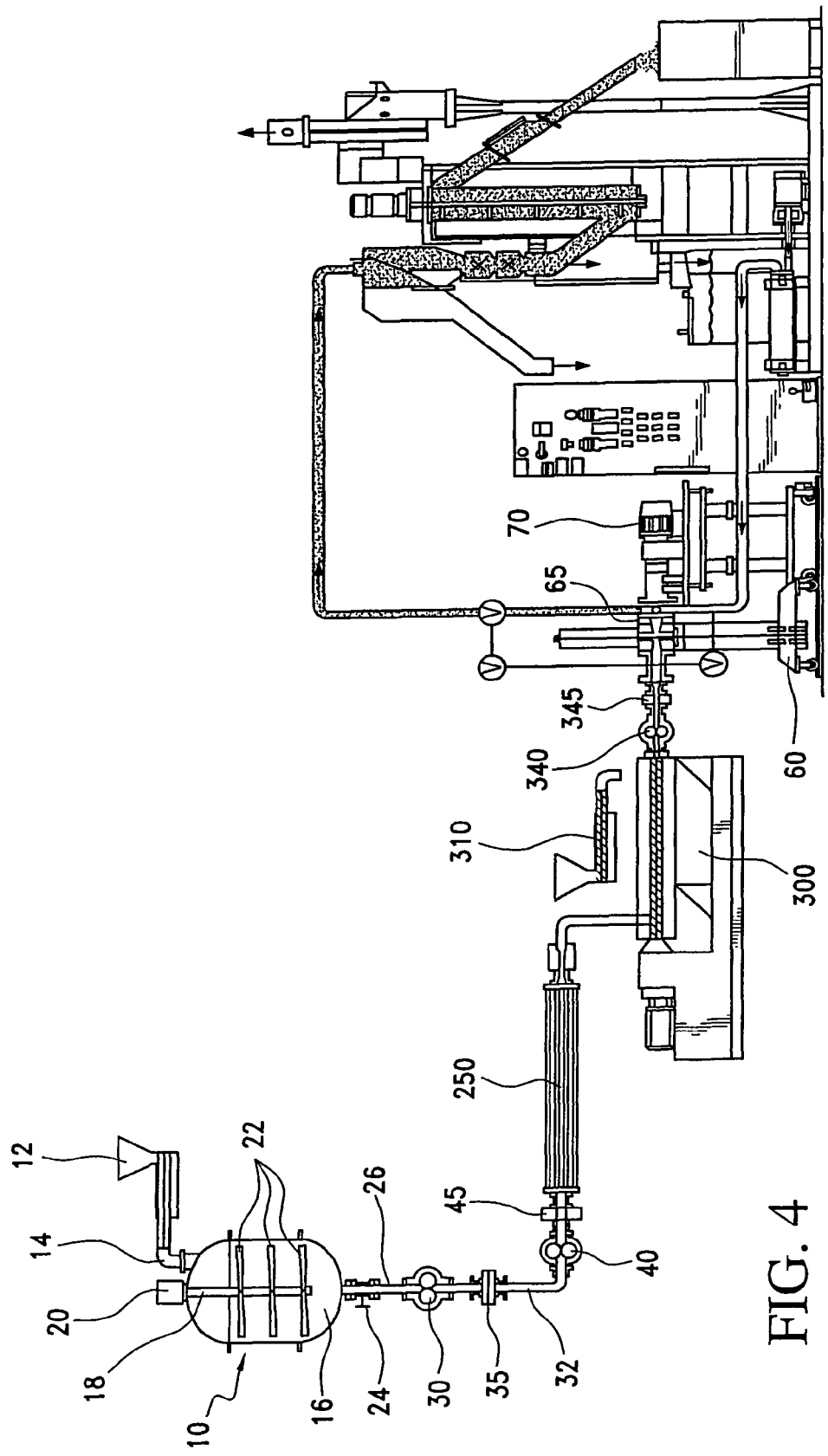
FIG. 4 is a schematic drawing illustrating a first embodiment of the present invention with sequentially arranged mixing vessel, filtration, melt cooling, extrusional dispersion and cooling, pelletizer and centrifugal dryer.
Figure 5:
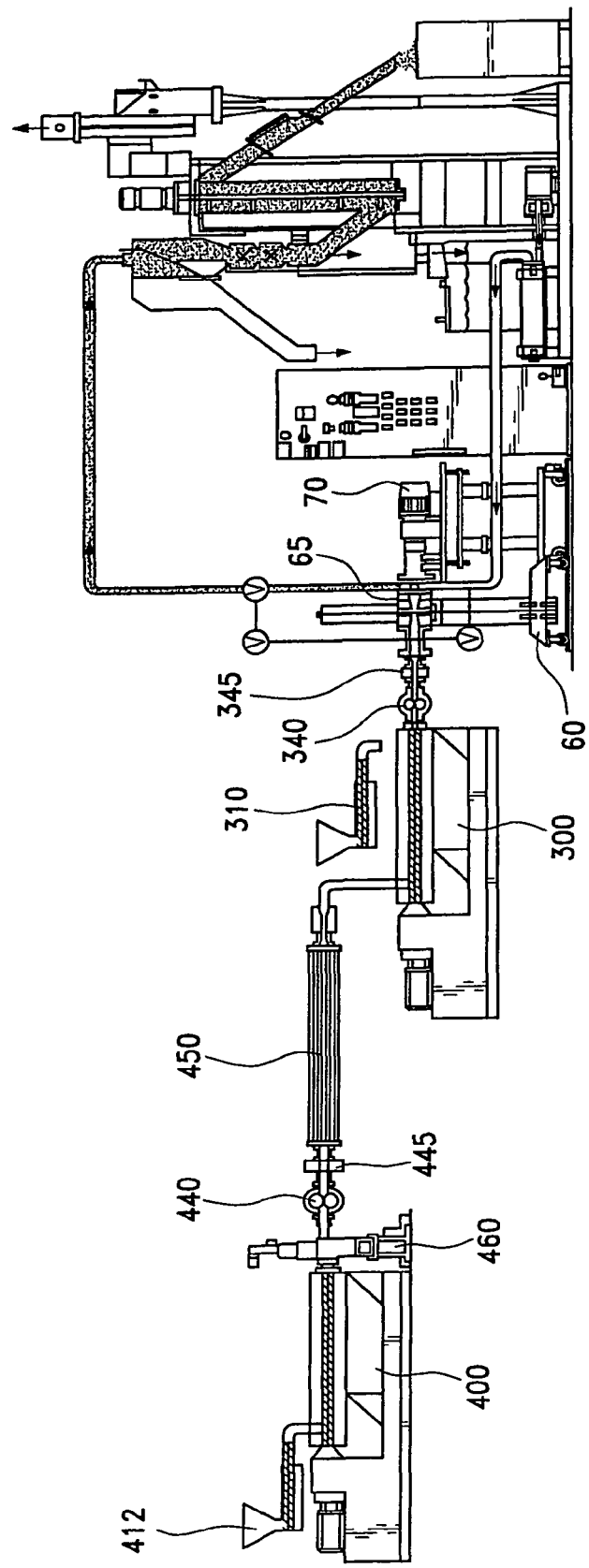
FIG. 5 is a schematic drawing illustrating a second embodiment of the present invention with sequentially arranged extrusional mixing, filtration, melt cooling, extrusional dispersion and cooling, pelletization, and centrifugal dryer.
Figure 6:
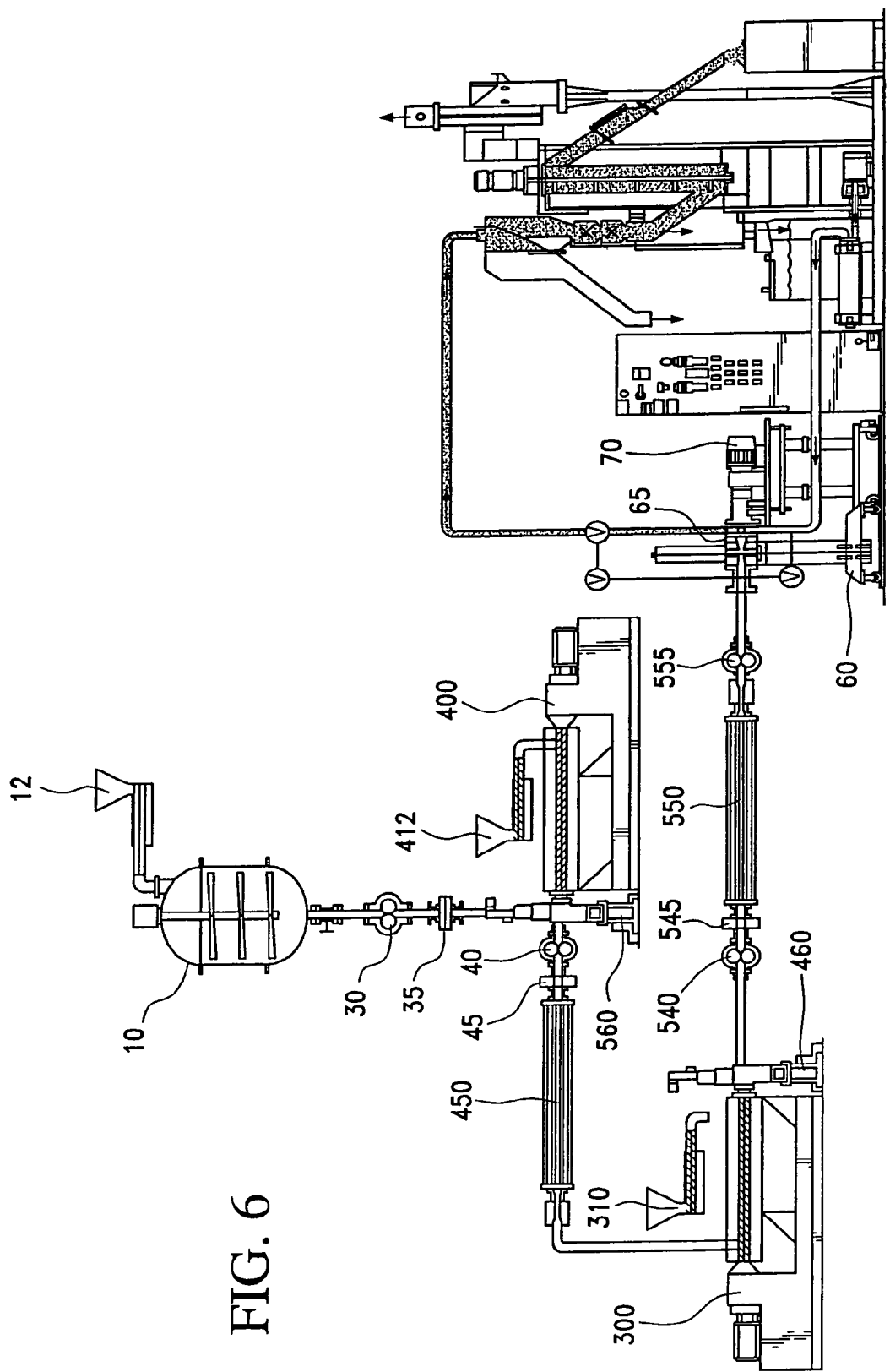
FIG. 6 is a schematic drawing illustrating a third embodiment of the present invention with sequentially arranged optional mixing vessel or mixing extruder, filtration, melt cooler, extruder for dispersion and cooling, optional additional melt cooling, pelletizer, and centrifugal dryer.

It is with these basic considerations and challenges that the preferred embodiments of the present invention are illustrated in FIGS. 4, 5, and 6. In all cases the equipment from the die face and downstream are the same as described for FIG. 1 and have not been described again for sake of conciseness and clarity.

In consideration of FIG. 4, the material or materials to be pelletized are charged into vessel 10 and progresses through the system analogous to that described in connection with FIG. 1 and as modified by incorporation of the melt cooler 250 as described in detail in connection with FIG. 3. Reference numbers and process preferences remain the same as for those similarly numbered components illustrated and described in connection with the prior drawing figures. The material or materials are mixed in the mixer 10 commonly with high shear and subsequently are high in temperature as well. On release of valve 24 the melt flows through pipe 26 to booster pump 30 and is moderately pressurized to insure flow into and through the coarse filter 35. Coarsely filtered flow proceeds through pipe 32 to melt pump 40 and is pressurized sufficiently to progress through screen changer 45 and melt cooler 250 where the temperature is reduced in accordance with the previous descriptions associated with FIGS. 1 and 3.

To maximize the dispersive homogeneity of the melt, it passes directly into a cooling extruder 300, which can be the same as previously described extruder 200 in connection with FIG. 2. The screw configuration of cooling extruder 300 should provide rigorous mixing and propagation through the distal zones or sections from the inlet where the further cooling is achieved. Addition of thermally sensitive ingredients may be accomplished through one or more side feeders 310, illustrated separately from extruder 300 to indicate the variability in positioning relative to that extruder. The side feed or side feeders 310 may provide additional solid, semi-solid or liquid materials to the mix such as rheological additives, miscibilizing agents, surfactants, expanding agents, catalysts, inhibitors, antioxidants, chain extenders, nucleation agents, flavors, fragrances, colorants, devolatilizing agents, chemical scavengers, or additives appropriate to the application and well known to those skilled in the art. On final mixing in the cooling extruder, the uniform and homogeneous melt has been cooled sufficiently for extrusional pelletization. Optionally a melt pump 340 and screen changer 345 may be positioned following the effluent orifice of the extruder 300 and prior to the inlet to the extrusion die 65. This allows pressure to be increased as necessary to achieve appropriate pelletization of the uniformly disperse, cooled product melt. Pelletization and drying follow as described in connection with FIG. 1. Inclusion and positioning of the booster pump 30, coarse filter 35, and screen changer 45 are optional.

The equipment illustrated in FIG. 5 follows that shown and described in FIG. 2 for shear mixing through the extruder 200. One or more feeders 412 may be solid or liquid inlets to the initial extruder 400 which are similar to feeders 212 and extruder 200, respectively, as described in connection with FIG. 2. In the embodiment of FIG. 5, extruder 400 is designed with screw objectives of shear mixing and melting. The melt passes through the outlet of the extruder through a diverter valve 460, comparable to diverter valve 60 described in connection with Figure i, and then through a booster pump 440 and coarse filter 445 into the melt cooler 450. Descriptions and preferences follow from analogous components, 40 and 45, as well as for melt cooler 450 versus 250, and differ only in that, although meeting the preference criteria described in connection with previous figures, they may or may not be identical to components 40, 45 or 250 in this preferred embodiment. As shown in FIG. 5, the cooled melt proceeds directly to the cooling extruder 300 and is processed in accordance with the description previously provided in connection with FIG. 4. Inclusion and positioning of the diverter valve 460, booster pump 440, and coarse filter 445 are optional.

FIG. 6 illustrates a composite of components from the FIGS. 4 and 5 embodiments. Mixing vessel 10 and/or extruder 400 with feed 412 may serve as the shear mixer and feed through a common diverter valve 560 into a melt pump 40 and screen changer 45. The melt proceeds through melt cooler 450 and into cooling extruder 300 and diverter 460 as previously described in connection with FIG. 5. Diverter 560 differs only in that it must provide two inlets as well as a waste/recycle and outlet position. From the outlet of the extruder 300 and diverter 460 the material optionally may pass through a melt pump 540 and screen changer 545 into a secondary melt cooler 550 for additional regulation of the temperature of the melt and final mixing. An additional melt pump 555 optionally provides further pressurization as the melt proceeds to the extrusion die 65 and through pelletization and drying as described previously. Additional pressurizations before the screen changers and melt coolers are preferable to insure proper flow of the melt through those devices. Pressure limitations of 2000 psi are commercially common and therefore limit pressurization prior to extrusion. The addition of melt pump 555 provides additional pressurization capabilities which may be necessary to proper extrusion through the die 65.

The illustrated embodiments reflect the use of a preferred centrifugal dryer to produce pellets with minimum surface moisture content. Pellets with high tack, high friability or brittleness, low melting or softening temperatures, or low deformation temperatures optionally may be processed through vibratory dewatering devices, fluidized beds, or other comparable devices not illustrated and well known to those skilled in the art to achieve the desired level of surface moisture. Prior to or subsequent to the drying operations alternatively, pellets may be coated, crystallized, or cooled by processes, techniques, and equipment readily available commercially.

By way of an example, a polyolefin copolymer was processed utilizing the apparatus illustrated in FIG. 4. The temperature in mixing vessel 10 to achieve formulation was 200° F. to 600° F., preferably 200° F. to 500° F., more preferably from 200° F. to 400° F., and most preferably from 300° F. to 400° F. The pour temperature of the melt from the vessel 10 was 200° F. to 600° F., preferably 200° F. to 500° F., more preferably from 200° F. to 400° F., and most preferably from 300° F. to 400° F. On cooling and subsequent mixing the temperature of the melt after the melt cooler 250 was 100° F. to 550° F., preferably 100° F. to 450° F., more preferably from 100° F. to 350° F., and most preferably from 200° F. to 300° F. With additional cooling through the cooling extruder 300, the temperature of the melt at the die plate 65 was reduced to 75° F. to 400° F., preferably 75° F. to 300° F., more preferably from 100° F. to 250° F., and most preferably from 150° F. to 250° F. The water temperature for the underwater pelletization was regulated at 40° F. to 200° F., preferably 40° F. to 150° F., more preferably from 40° F. to 100° F., and most preferably from 40° F. to 80° F. to insure proper pellet geometry, sufficiently low temperature for pelletization without deformation, reduced likelihood of freeze-off at the die, and to avoid wrapping the extrudate around the face of the die by rotation of the cutter.

Asphalt to be pelletized in accordance with the apparatus and method of the present invention may be naturally occurring or synthetic including, for example, formulations comprised of bitumen, plasticizers, a binder, and/or a polymeric resin base. Bitumen exemplarily may be derived from crude oil, petroleum pitch, plastic residues from distillation of coal tar, mineral waxes, bituminous schists, bituminous sands, bituminous coal, and asphalt dispersions.

Adhesives to be processed in accordance with the apparatus and method of the present invention include those containing a polymeric base or binder, tackifier, wax, fillers, additives and the like. Gum bases similarly contain a polymeric base which is capable of mastication, polymeric gum base, emulsifiers, softeners or plasticizers, texturizing agents, fillers, flavors, and fragrances. Thermally and oxidatively sensitive medicaments and medicating agents are also contained within the scope of applications for the present invention.

Polymeric bases and gum bases may include acrylonitrile-butadiene-styrene elastomers, alkyds, amorphous polyalphaolefins or APAO, atatic polypropylene, balata, butadiene rubber, chicle, crumb rubber, ethylene-acrylic acid copolymers, ethylene-cyclopentadiene copolymers, ethylene-methacrylate copolymers, ethylene-propylene-diene monomer or EPDM, ethylene-vinyl acetate copolymers, ethylene-vinyl alcohol copolymers, guayule, gutta hang kang, guttapercha, halobutyl rubber, high density polyethylene or HDPE, isobutylene rubber, isobutylene-isoprene copolymeric rubber, isotactic polybutene, polypropylene, and polystyrene, jelutong gum, lechi caspi, low density polyethylene or LDPE, maleated polyolefins, massaranduba balata, massaranduba chocolate, natural or liquid latexes, natural rubber, nispero, nitrile or halonitrile rubber, oxidized polyolefins, perillo, polyacrylamides, polyacrylates, polyacrylonitriles, polyamides, polybutadiene, polycarbonates, polychloroprene, polyesters including PET and PBT, polyisoprene, polynorbornenes, polysilicates, polyurethane, polyvinylacetate or PVA or PVAc, polyvinyl alcohol, polyurea, pontianak gum, rosindinha, sorva, styrene-acrylonitrile, styrene butadiene rubber or SBR, styrene butadiene styrene or SBS, styrene ethylene butylene block copolymers, styrene ethylene propylene block copolymers, styrene-isoprene rubber or SIR, styrene-isoprene-butadiene rubber or SIBR, styrene-isoprene-styrene or SIS, vinyl acetate homopolymer, vinyl acetate-vinyl laurate copolymers, or blends thereof, by way of example. Masticatory or chewable bases may also include prolamines, gliadin, horedein, zein, or similar proteinaceous materials. Polymeric materials may be cross-linked or cross-linkable.

Tackifiers, and resins, often as plasticizers and softeners, for processing in accordance with the present invention, include hydrocarbons which are aliphatic, cycloaliphatic, and aromatic, mixed aliphatic/aromatic hydrocarbons, natural and partially hydrogenated rosin esters, natural and partially hydrogenated wood rosins, glycerol rosin esters, glycerol tall oil ester, maleic-modified rosin, pentaerythritol rosin esters, polyterpenes, terpenes, a-pinene, b-pinene, and d-limonene, phenolic modified terpenes, polyethylene grease, polyvinylacetate, mineral oils including paraffinic and naphthionic, and styrene-terpene copolymers, as well as other liquid plasticizers well known to those skilled in the art.

Waxes, individually or formulationally, which may be processed in accordance with the present invention, include beeswax, candelilla wax, carnauba, ceresin wax, China wax, Fischer-Tropsch waxes including oxidized forms, high density low molecular weight polyethylene or HDLMWPE, hydroxystearamide wax, japan wax, lardeceine, lignite wax, microcrystalline wax, ozokerite, paraffin or petroleum wax, polyethylene wax, polyolefin wax, rice bran wax, sugarcane wax, and vegetable waxes including those from canola, coconut, corn, cottonseed, crambe, linseed, palm, palm kernel, peanut, rape, or soybean.

High melt flow polymerics, for processing in accordance with the present invention, include low viscosity molten polyolefins and preferably include polypropylene and vinylic copolymers thereof including ethylene, butylene, cyclic vinylics by way of example.

Emulsifiers, colorants, fillers, flavorants, perfumants, and other additives appropriate to the formulation and known to those skilled in the art can be used as desired in accordance with the present invention.

The term "melt" as used in the claims following hereafter, and as used previously herein, is intended to encompass all extrudable forms of a material or materials, including but not limited to molten, semi-solid, mixed or liquid material or materials.

Further, it is not intended that the present invention be limited to the specific processes described herein. The foregoing is considered as illustrative only of the principles of the invention. Further, numerous modifications and changes will readily occur to those skilled in the art, it is not desired to limit the invention to the exact construction and operation shown and described, and, accordingly, all suitable modifications and equivalents may be resorted to, falling within the scope of the invention.

The invention claimed is:

1. A method for pelletizing materials which are otherwise difficult to pelletize in a pelletizer processing line including a pelletizer with an extrusion die, the method comprising the steps of: forming a melt of a material difficult to be pelletized; passing the melt through a heat exchanger located upstream of a cooling extruder to cool the melt in advance of said cooling extruder; directly passing said melt into and through the cooling extruder from said heat exchanger, said cooling extruder processing and mixing said melt to increase dispersive homogeneity of the melt and to further cool the melt to an appropriate temperature for extrusional pelletization; feeding the melt into said extrusion die of said pelletizer located downstream of said cooling extruder; pelletizing the melt into pellets in said pelletizer; and drying said pellets in a dryer.

2. The method as claimed in claim 1, wherein the pelletizing step is carried out in an underwater, hot face, strand or water ring pelletizer.

3. The method as claimed in claim 1, wherein the pelletizing step is carried out in an underwater pelletizer.

4. The method as claimed in claim 1, wherein the pelletizing step is carried out in a hot face pelletizer.

5. The method as claimed in claim 1, wherein said step of forming a melt to be pelletized includes filtering the melt and pressurizing the melt sufficiently to ensure its passage through the cooling extruder and through said extrusion die of said pelletizer.

6. The method as claimed in claim 1, wherein, after said melt is passed through said cooling extruder, the melt is further pressurized and passed through a screen changer before entering said extrusion die of the pelletizer.

7. The method as claimed in claim 1, wherein said step of forming a melt to be pelletized includes passing the melt through a diverter valve in order to divert said melt from the processing line when desired.

8. The method as claimed in claim 1, wherein the step of passing the melt through the cooling extruder includes the addition of thermally sensitive ingredients through one or more feeders of said cooling extruder.

9. The method as claimed in claim 8, wherein said sensitive ingredients may be solid or liquid and selected from the group consisting of rheological additives, miscibilizing agents, surfactants, expanding agents, catalysts, inhibitors, antioxidants, chain extenders, nucleation agents, flavors, fragrances, colorants, devolatilizing agents, and chemical scavengers.

10. The method as claimed in claim 1, wherein, after passing said melt through said cooling extruder, the melt is passed through a second heat exchanger located downstream of said cooling extruder for additional regulation of the temperature and final mixing of the melt before entering said extrusion die of the pelletizer.

11. The method as claimed in claim 1, wherein, before passing said melt through said heat exchanger, the melt is passed through a first extruder for shear mixing and melting.

12. The method as claimed in claim 1, wherein said cooling extruder is selected from a single, twin, multiple screw, or a ring extruder.

13. An apparatus for pelletizing materials which are otherwise difficult to pelletize in a pelletizer processing line comprising: a mixing device for forming a melt of a material difficult to be pelletized; a pelletizer having an extrusion die; a heat exchanger located downstream of said mixing device and upstream of said pelletizer, said heat exchanger configured to cool said melt received from said mixing device; a cooling extruder located upstream of said pelletizer and extrusion die and directly downstream of said heat exchanger, said cooling extruder configured to process and mix said melt to increase the dispersive homogeneity of the melt and to cool the melt to an appropriate temperature for extrusional pelletization before introduction into said extrusion die of the pelletizer; and a drying component located downstream of said pelletizer.

14. The apparatus as claimed in claim 13, wherein the pelletizer is an underwater, hot face, strand or water ring pelletizer.

15. The apparatus as claimed in claim 13, wherein the pelletizer is an underwater pelletizer.

16. The apparatus as claimed in claim 13, wherein the pelletizer is a hot face pelletizer.

17. The apparatus as claimed in claim 13, wherein said processing line includes one or more pumps sufficient to pressurize the melt to ensure its passage through the cooling extruder and through said extrusion die of said pelletizer.

18. The apparatus as claimed in claim 13, wherein said processing line includes one or more pumps after said cooling extruder to further pressurize said melt before entering said extrusion die of the pelletizer.

19. The apparatus as claimed in claim 13, wherein said processing line includes a diverter valve in advance of said cooling extruder to divert the melt from the processing line when desired.

20. The apparatus as claimed in claim 13, wherein said cooling extruder includes one or more feeders for the addition of one or more thermally sensitive ingredients.

21. The apparatus as claimed in claim 20, wherein said one or more feeders are configured to add sensitive ingredients that may be solid or liquid and selected from the group consisting of rheological additives, miscibilizing agents, surfactants, expanding agents, catalysts, inhibitors, antioxidants, chain extenders, nucleation agents, flavors, fragrances, colorants, devolatilizing agents, and chemical scavengers.

22. The apparatus as claimed in claim 13, wherein said processing line includes a second heat exchanger after said cooling extruder for additional regulation of the temperature and final mixing of the melt before entering said extrusion die of the pelletizer.

23. The apparatus as claimed in claim 13, wherein said mixing device in said processing line includes a first extruder positioned upstream of said heat exchanger, said melt passing through said first extruder for shear mixing and melting before passing into said heat exchanger.

24. The apparatus as claimed in claim 13, wherein said cooling extruder is a single, twin, multiple screw, or a ring extruder.

25. The apparatus as claimed in claim 13, wherein said heat exchanger is a coil-type, scrape wall, plate and frame, or a shell and tube design with or without static mixers, or a U-style tube design with or without static mixers.

26. The apparatus as claimed in claim 23, wherein said processing line includes a second heat exchanger after said cooling extruder for additional regulation of the temperature and final mixing of the melt before entering said extrusion die of the pelletizer.

27. The method as claimed in claim 11, wherein, after the melt has passed through the cooling extruder, the melt is passed through a second heat exchanger located downstream of said cooling extruder for additional regulation of the temperature and final mixing of the melt before entering said extrusion die of the pelletizer.

28. A method for pelletizing materials which are otherwise difficult to pelletize in a pelletizer processing line including a pelletizer with an extrusion die, the method comprising the steps of:
   forming a melt to be pelletized;
   passing the melt through a heat exchanger located upstream of a cooling extruder to cool the melt in advance of said cooling extruder;
   passing said melt through the cooling extruder for processing and mixing to increase dispersive homogeneity of the melt and to further cool the melt to an appropriate temperature for extrusional pelletization and, while passing said melt through the cooling extruder, adding at least one thermally sensitive ingredient into said melt while in said cooling extruder through one or more feeders;
   feeding the melt into said extrusion die of said pelletizer located downstream of said cooling extruder;
   pelletizing the melt into pellets in said pelletizer; and
   drying said pellets in a dryer.

29. An apparatus for pelletizing materials which are otherwise difficult to pelletize in a pelletizer processing line comprising:
   a mixing device for forming a melt to be pelletized;
   a pelletizer having an extrusion die;
   a heat exchanger located downstream of said mixing device and upstream of said pelletizer, said heat exchanger configured to cool said melt received from said mixing device;
   a cooling extruder located downstream of said heat exchanger and upstream of said pelletizer and extrusion die, said cooling extruder configured to receive cooled melt from said heat exchanger through an extruder inlet and to then process and mix said melt in said extruder to increase the dispersive homogeneity of the melt and to cool the melt to an appropriate temperature for extrusional pelletization before introduction into said extrusion die of the pelletizer;
   said cooling extruder including one or more feeders separate from and downstream of said extruder inlet for the addition of one or more thermally sensitive ingredients into said melt while said melt is being processed in said cooling extruder; and
   a drying component located downstream of said pelletizer.

30. A method for pelletizing materials which are otherwise difficult to pelletize in a pelletizer processing line including a pelletizer with an extrusion die, the method comprising the steps of:
   forming a melt to be pelletized;
   passing the melt through a first extruder for shear mixing and melting;
   passing the melt through a heat exchanger located downstream of said first extruder and upstream of a cooling extruder to cool the melt in advance of said cooling extruder;
   passing said melt through the cooling extruder for processing and mixing to increase dispersive homogeneity of the melt and to further cool the melt to an appropriate temperature for extrusional pelletization;
   feeding the melt into said extrusion die of said pelletizer located downstream of said cooling extruder;
   pelletizing the melt into pellets in said pelletizer; and
   drying said pellets in a dryer.

31. An apparatus for pelletizing materials which are otherwise difficult to pelletize in a pelletizer processing line comprising:
   a mixing device for forming a melt to be pelletized, said mixing device including a first extruder through which said melt passes for shear mixing and melting;
   a pelletizer having an extrusion die;
   a heat exchanger located downstream of said mixing device and upstream of said pelletizer, said heat exchanger configured to cool said melt received from said mixing device;
   a cooling extruder located downstream of said heat exchanger and upstream of said pelletizer and extrusion die, said cooling extruder configured to process and mix said melt to increase the dispersive homogeneity of the melt and to cool the melt to an appropriate temperature for extrusional pelletization before introduction into said extrusion die of the pelletizer; and
   a drying component located downstream of said pelletizer.

32. An apparatus for pelletizing materials which are otherwise difficult to pelletize in a pelletizer processing line comprising:
   a mixing device for forming a melt to be pelletized;
   a pelletizer having an extrusion die;
   a heat exchanger located downstream of said mixing device and upstream of said pelletizer, said heat exchanger configured to cool said melt received from said mixing device;
   a cooling extruder located downstream of said heat exchanger and upstream of said pelletizer and extrusion die, said cooling extruder configured to process and mix said melt to increase the dispersive homogeneity of the melt and to cool the melt to an appropriate temperature for extrusional pelletization;
   one or more pumps located downstream of said cooling extruder and upstream of said pelletizer and extrusion die to further pressurize said melt before entering said extrusion die of the pelletizer; and
   a drying component located downstream of said pelletizer.

33. A method for pelletizing materials which are otherwise difficult to pelletize in a pelletizer processing line including a pelletizer with an extrusion die, the method comprising the steps of:

forming, in a mixing device, a melt to be pelletized;

cooling said melt received from said mixing device in a heat exchanger located downstream of said mixing device and upstream of said pelletizer and said extrusion die;

processing and mixing said melt using a cooling extruder located downstream of said heat exchanger and upstream of said pelletizer and extrusion die, said processing and mixing of said melt increasing the dispersive homogeneity of the melt and further cooling the melt to an appropriate temperature for extrusional pelletization;

pressurizing said melt before entering said extrusion die of the pelletizer using one or more pumps located downstream of said cooling extruder and upstream of said pelletizer and extrusion die;

pelletizing the melt into pellets in said pelletizer using said extrusion die; and passing said pellets to a drying component located downstream of said pelletizer.

* * * * *